United States Patent
Kaul et al.

(10) Patent No.: US 7,855,157 B1
(45) Date of Patent: Dec. 21, 2010

(54) MULTI-FUNCTIONAL LAYERED STRUCTURE HAVING STRUCTURAL AND RADIATION SHIELDING ATTRIBUTES

(75) Inventors: Raj K. Kaul, Owens Cross Roads, AL (US); Abdulnasser Fakhri Barghouty, Madison, AL (US); Benjamin G. Penn, Madison, AL (US); Anthony Bruce Hulcher, New Market, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 312 days.

(21) Appl. No.: 12/142,220

(22) Filed: Jun. 19, 2008

(51) Int. Cl.
 B32B 5/26 (2006.01)
 B32B 5/28 (2006.01)

(52) U.S. Cl. .......... 442/220; 442/64; 442/71; 442/131; 442/170; 442/268; 442/269; 442/277; 442/281; 442/366; 442/381; 442/389; 442/415

(58) Field of Classification Search .......... 442/64, 442/71, 131, 134, 164, 170, 203, 208, 209, 442/213, 218, 220, 268, 269, 277, 281, 366, 442/381, 389, 415
See application file for complete search history.

(56) References Cited

U.S. PATENT DOCUMENTS

| 3,807,384 | A |   | 4/1974 | Schach |
|---|---|---|---|---|
| 4,670,658 | A |   | 6/1987 | Meyers |
| 4,784,898 | A | * | 11/1988 | Raghava ............ 442/253 |
| 4,868,400 | A |   | 9/1989 | Barnhart |
| 4,995,795 | A |   | 2/1991 | Hetzel |
| 5,225,114 | A |   | 7/1993 | Anderson |
| 5,471,065 | A |   | 11/1995 | Harrell |
| 5,531,899 | A |   | 7/1996 | Yen |
| 5,746,128 | A |   | 5/1998 | Reichwein |
| 5,861,204 | A |   | 1/1999 | O'Sullivan |
| 5,965,245 | A |   | 10/1999 | Okano |
| 6,069,192 | A |   | 5/2000 | Shalaby |
| 6,172,163 | B1 |   | 1/2001 | Rein |

(Continued)

FOREIGN PATENT DOCUMENTS

JP    10175273 A    6/1998

OTHER PUBLICATIONS

Kaul, Barghouty, Dahche, Radiation Transport Properties of Polyethylene-Fiber Composites, Proceedings of the Microgravity Transport Processes in Fluid, Thermal, Biological and Materials Sciences III, Sep. 14 to 19, 2003.

(Continued)

Primary Examiner—Andrew T Piziali
(74) Attorney, Agent, or Firm—Peter J. Van Bergen; James J. McGroary

(57) ABSTRACT

A cosmic and solar radiation shielding structure that also has structural attributes is comprised of three layers. The first layer is 30-42 percent by volume of ultra-high molecular weight (UHMW) polyethylene fibers, 18-30 percent by volume of graphite fibers, and a remaining percent by volume of an epoxy resin matrix. The second layer is approximately 68 percent by volume of UHMW polyethylene fibers and a remaining percent by volume of a polyethylene matrix. The third layer is a ceramic material.

20 Claims, 2 Drawing Sheets

U.S. PATENT DOCUMENTS

| | | |
|---|---|---|
| 6,365,089 B1 | 4/2002 | Krebs |
| 6,391,959 B1 | 5/2002 | Ninomiya |
| 6,551,010 B1 | 4/2003 | Kiedaisch |
| 6,764,617 B1 | 7/2004 | Viswanathan |
| 6,808,773 B2 | 10/2004 | Shimamura |
| 6,951,685 B1 | 10/2005 | Weeden |
| 7,799,710 B1 * | 9/2010 | Tan .............................. 442/221 |

OTHER PUBLICATIONS

Kaul, Barghouty, Dahche, Space Radiation Transport Properties of Polyethylene-Based Composites, Annals New York Academy of Sciences, 2004, 138-149, vol. 1027, New York City, NY.

* cited by examiner

MULTI-FUNCTIONAL LAYERED STRUCTURE HAVING STRUCTURAL AND RADIATION SHIELDING ATTRIBUTES

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to materials and/or structures that provide radiation shielding. More specifically, the invention is a layered structure that provides cosmic and solar radiation shielding while also serving structural purposes.

2. Description of the Related Art

One of the most significant technical challenges in long-duration deep-space missions is that of protecting the crew from harmful and potentially lethal exposure to ionizing radiation. Energetic, high-charge galactic cosmic-ray (GCR) ions and solar energetic particles (SEP) constitute the two main sources of this intense radiation environment. Protection against GCR and SEP radiation fields on a manned Mars mission, for example, is vital both during transit and while on the surface of the planet because of the duration of the mission and the lack of sufficient protection from the thin Martian atmosphere. The development of multi-functional materials that can serve as integral structural members of the space vehicle while providing the necessary radiation shielding for the crew is both mission enabling as well as cost effective. Additionally, combining shielding and structure can reduce total vehicle mass thereby simplifying propulsion system design.

SUMMARY OF THE INVENTION

Accordingly, it is an object of the present invention to provide a structure that can shield against cosmic and solar radiation.

Another object of the present invention is to provide a structure that has structural attributes and cosmic/solar radiation shielding attributes.

Still another object of the present invention is to provide a structure for use in long-duration space applications.

Other objects and advantages of the present invention will become more obvious hereinafter in the specification and drawings.

In accordance with the present invention, a multi-functional structure that has structural attributes and that provides cosmic and solar radiation shielding is comprised of three layers. The composition of the first layer is 30-42 percent by volume of ultra-high molecular weight (UHMW) polyethylene fibers, 18-30 percent by volume of graphite fibers, and a remaining percent by volume of an epoxy resin matrix. The second layer is disposed adjacent to the first layer and is composed of approximately 68 percent by volume of UHMW polyethylene fibers and a remaining percent by volume of a polyethylene matrix. The third layer is disposed adjacent to the second layer such that the second layer is sandwiched between the first layer and the third layer. The third layer is composed of a ceramic material.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
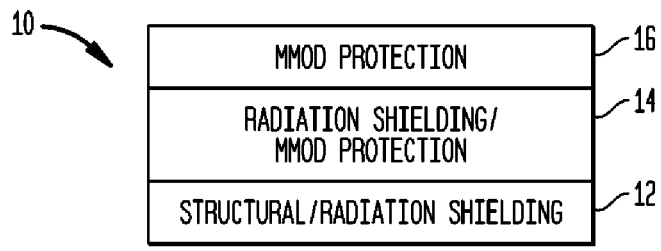
FIG. 1 is a schematic view of layered structure that has structural attributes and that provides cosmic and solar radiation shielding in accordance with the present invention.

Referring now to the drawings and more particularly to FIG. 1, a novel composite structure well-suited for space vehicles and/or habitats is shown schematically and is referenced generally by numeral 10. Structure 10 is multi-functional in that it possesses structural attributes, cosmic and solar radiation shielding attributes, and micro-meteoroid (MMOD) protection attributes. As will be readily apparent to one of ordinary skill in the art, structure 10 can be readily fabricated into a variety of structural components of various size and shape. Accordingly, it is to be understood in that the rectangular and/or planar shapes used in the figures referenced herein are merely to facilitate an understanding of the present invention and are not limitations thereof.

Structure 10 is a layered structure where each layer provides one or more of the above-noted attributes. FIG. 1 depicts the general material composition of structure 10 with the remaining figures depicting possible constructions of the various layers that embody the general material composition thereof. Structure 10 is defined by three distinct layers 12, 14, and 16, with each such layer being capable of fabrication in accordance with techniques well understood in the art. Accordingly, it is to be understood that structure is not limited by the fabrication techniques used to construct same.

Layer 12 is designed to provide both structural attributes and radiation shielding attributes. The composition of layer 12 includes 30-42 percent by volume of "ultra-high molecular weight" (UHMW) polyethylene fibers, 18-30 percent by volume of graphite fibers, and a remaining percent by volume (i.e., 28-52 percent by volume) of an epoxy resin matrix. UHMW polyethylene fibers are known in the art. The polyethylene fibers are typically long fibers or continuous fibers as they are sometimes referred to. The graphite fibers are any of a variety of long (or "continuous") fibers. As will be explained further below, the UHMW polyethylene fibers and graphite fibers can be interwoven or can be arranged in separate plies.

In either case, the epoxy resin matrix impregnates the interstices formed between and around the fibers. Typically, the epoxy resin matrix is a thermo-set matrix that flows when heated and solidifies when cooled. The presence of UHMW polyethylene fibers provides radiation shielding while the combination of UHMW polyethylene fibers and graphite fibers provide a strong, lightweight composite.

Layer 14 is designed to provide both radiation shielding attributes and "micro-meteoroid" (MMOD) protection. The composition of layer 14 includes approximately 68 percent by volume of UHMW polyethylene fibers with a remaining (approximately) 32 percent by volume of a polyethylene matrix with the polyethylene matrix impregnating the interstices between and around the fibers. Once again, the UHMW polyethylene fibers will typically be long. Possible orientations for the fibers will be discussed further below. The one hundred percent polyethylene composition of layer 14 provides excellent radiation shielding while the substantial use of UHMW fibers in layer 14 provides MMOD protection, too.

Layer 16 is designed to provide MMOD protection. Accordingly, layer 16 will typically form the outermost layer of structure 10. Layer 16 is ceramic material (e.g., in tile form to allow structure 10 to be fabricated in a complex shape) attached or bonded to layer 14. For space vehicle and/or space habitat applications, the ceramic material is aluminum oxide, boron carbide, or silicon carbide.

Figure 2:
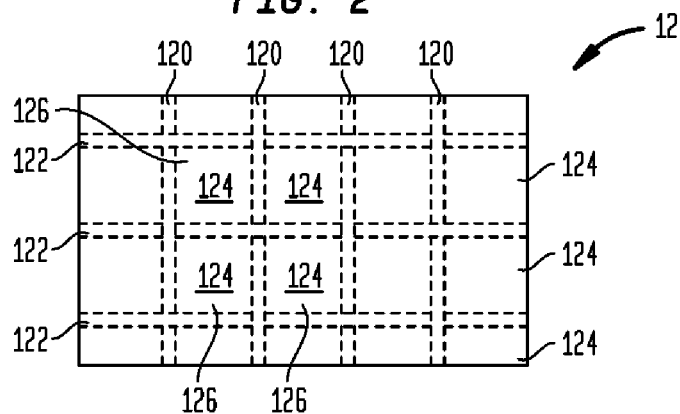
FIG. 2 is a plan view of the structure's layer that has both structural attributes and radiation shielding attributes in accordance with an embodiment of the present invention.

A variety of constructions of structure 10 are possible based on the above-described composition of structure 10. For example, FIG. 2 illustrates one possible configuration of UHMW polyethylene fibers 120 and graphite fibers 122 in layer 12. That is, fibers 120 and 122 are interwoven to define a fabric ply with the epoxy resin matrix 124 impregnated in interstices 126 between the fibers and with epoxy resin matrix 124 disposed around the fibers. It is to be understood that the size of interstices 126 is exaggerated for clarity of illustration. Although only one fabric ply of woven fibers 120/122 is illustrated, it is to be understood that multiple plies of woven fibers 120/122 could be used/stacked to achieve a desired thickness for layer 12.

Figure 3:
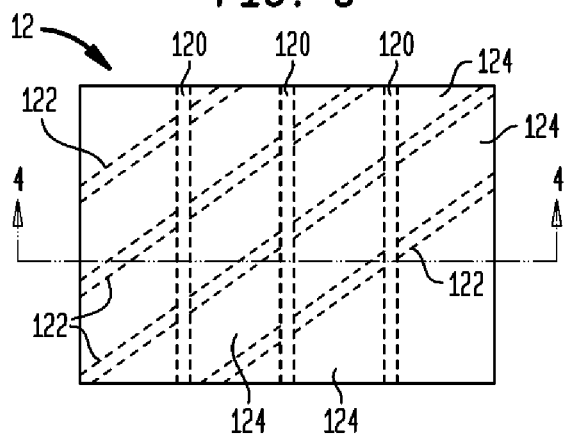
FIG. 3 is a plan view of another embodiment of the structure's layer that has structural attributes and radiation shielding attributes.
Figure 4:
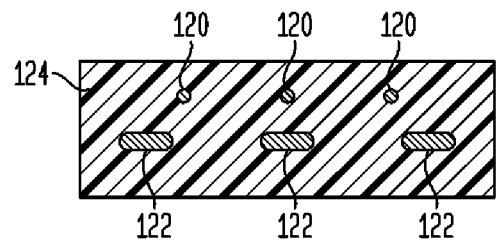
FIG. 4 is a cross-sectional view taken along line 4-4 of FIG. 3.

FIGS. 3-4 illustrate another possible construction for layer 12 in which UHMW polyethylene fibers 120 are not interwoven with graphite fibers 120. For example, in the illustrated embodiment, UHMW polyethylene fibers 120 and graphite fibers 122 are laid up in different plies of layer 12. Fibers 120 are oriented substantially the same way and fibers 122 are oriented substantially the same way, but the orientation of fibers 120 is different relative to fibers 122 in order to satisfy the structural needs of a specific application. In this example, epoxy resin matrix 124 fills the spaces between fibers 120 and fibers 122, as well as encasing the plies of fibers 120 and 122. As in the previous example, it is to be understood that the amount of spacing between fibers and plies thereof is exaggerated to provide clarity in the illustrations. Furthermore, additional plies of fibers 120 and/or 122 could be included to thicken layer 12. The additional plies could utilize the same or different fiber orientations without departing from the scope of the present invention. Still further, the additional plies could use just fibers 120, just fibers 122, or both types of fibers. The plies can, but need not, alternate between fibers 120 and fibers 122.

Figure 5:
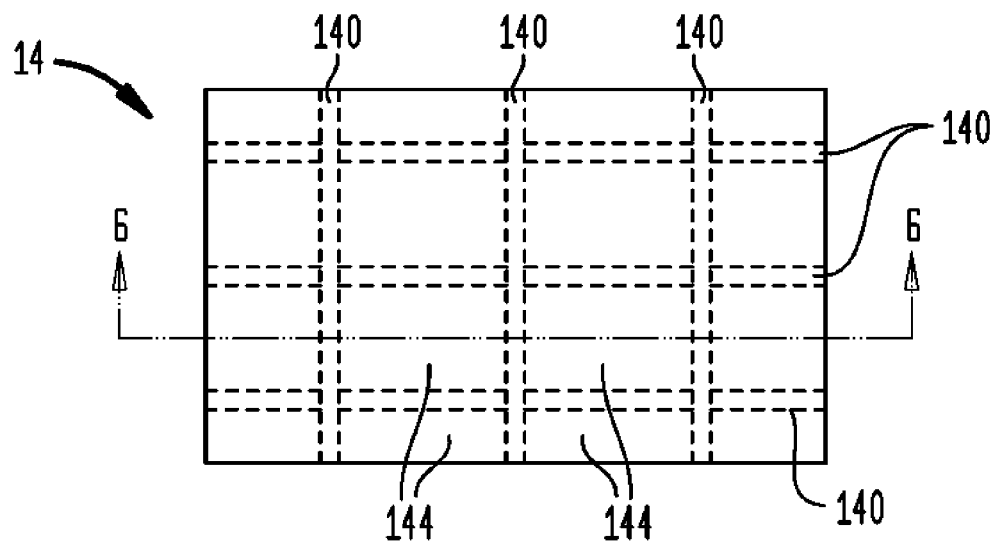
FIG. 5 is a plan view of the structure's layer that has both radiation shielding attributes and micro-meteoroid protection attributes in accordance with an embodiment of the present invention.
Figure 6:
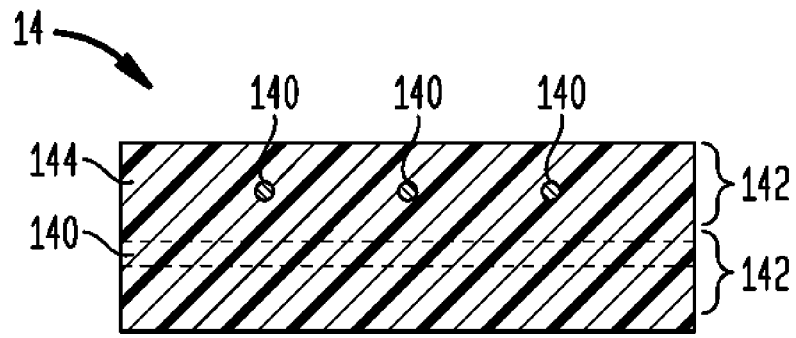
FIG. 6 is a cross-sectional view taken along line 6-6 of FIG. 5.

FIGS. 5 and 6 illustrate a possible construction for layer 14 in which UHMW polyethylene fibers 140 are laid up in multiple plies 142 (e.g., two plies are shown in the illustrated example) with the fibers in a ply being oriented in substantially the same direction that is orthogonal to the fibers in an adjacent one of plies 142. Polyethylene matrix 144 fills or impregnates the spaces between fibers 140 and between plies 142. Additional plies 142 can be incorporated into layer 14 as needed for a particular application.

As mentioned above, layers 12, 14, and 16 will typically be bonded together. This can be achieved in a variety of ways without departing from the scope of the present invention. For example, layers 12 and 14 could be laid up at the same time to form a desired shape, and then co-cured. Layer 16 could be provided in the form of tiles of ceramic material and bonded to layer 14 in ways understood in the art. By constructing layer 16 from tiles of a ceramic material, the co-cured composite defined by layers 12 and 14 can assume a complex shape. That is, tiles of ceramic can be sized/shaped as needed to "tile" the complex shape.

The advantages of the present invention are numerous. The novel composite structure provides the multiple functions of MMOD protection, radiation shielding, and structural support. The structure is made from commercially-available materials and can be fabricated using proved manufacturing technologies. The present invention defines both composition and construction configurations for a multi-functional structure that can be used in the design/manufacture of long-duration space vehicles and/or habitats.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A multi-functional structure, comprising:
   a first layer having 30-42 percent by volume of ultra-high molecular weight (UHMW) polyethylene fibers, 18-30 percent by volume of graphite fibers, and a remaining percent by volume of an epoxy resin matrix;
   a second layer disposed adjacent to said first layer, said second layer having approximately 68 percent by volume of UHMW polyethylene fibers and a remaining percent by volume of a polyethylene matrix; and
   a third layer disposed adjacent to said second layer wherein said second layer is sandwiched between said first layer and said third layer, said third layer comprising a ceramic material.

2. A multi-functional structure as in claim 1 wherein said epoxy resin matrix comprises a thermo-set matrix.

3. A multi-functional structure as in claim 1 wherein said first layer comprises at least one ply of said UHMW polyethylene fibers interwoven with said graphite fibers with said epoxy resin matrix impregnated in said at least one ply.

4. A multi-functional structure as in claim 1 wherein said first layer comprises multiple plies defined by at least one ply of said UHMW polyethylene fibers and at least one separate ply of said graphite fibers with said epoxy resin matrix impregnated in and between said multiple plies.

5. A multi-functional structure as in claim 1 wherein said second layer comprises said UHMW polyethylene fibers arranged in plies with said UHMW polyethylene fibers in alternating ones of said plies having the same orientation, and wherein said UHMW polyethylene fibers in adjacent ones of said plies are orthogonally oriented.

6. A multi-functional structure as in claim 1 wherein said ceramic material comprises ceramic tiles bonded to said second layer.

7. A multi-functional structure as in claim 1 wherein said ceramic material is selected from the group consisting of aluminum oxide, boron carbide and silicon carbide.

8. A multi-functional structure as in claim 1 wherein said first layer and said second layer are bonded together, and wherein said third layer is bonded to said second layer.

9. A multi-functional structure, comprising:
- a first composite having 30-42 percent by volume of ultra-high molecular weight (UHMW) polyethylene fibers and 18-30 percent by volume of graphite fibers, and a remaining percent by volume of an epoxy resin matrix;
- a second composite bonded to said first composite, said second composite having approximately 68 percent by volume of UHMW polyethylene fibers impregnated with a remaining percent by volume of a polyethylene matrix; and
- a ceramic material bonded to said second composite wherein said second composite is sandwiched between said first composite and said ceramic material.

10. A multi-functional structure as in claim 9 wherein said epoxy resin matrix comprises a thermo-set matrix.

11. A multi-functional structure as in claim 9 wherein said first composite comprises at least one ply of said UHMW polyethylene fibers interwoven with said graphite fibers with said epoxy resin matrix impregnated in said at least one ply.

12. A multi-functional structure as in claim 9 wherein said first composite comprises multiple plies defined by at least one ply of said UHMW polyethylene fibers and at least one separate ply of said graphite fibers with said epoxy resin matrix impregnated in and between said multiple plies.

13. A multi-functional structure as in claim 9 wherein said second composite comprises said UHMW polyethylene fibers arranged in plies with said UHMW polyethylene fibers in each of said plies having the same orientation, and wherein said UHMW polyethylene fibers in adjacent ones of said plies are orthogonally oriented.

14. A multi-functional structure as in claim 9 wherein said ceramic material comprises ceramic tiles.

15. A multi-functional structure as in claim 9 wherein said ceramic material is selected from the group consisting of aluminum oxide, boron carbide and silicon carbide.

16. A multi-functional structure, comprising:
- a first composite having 30-42 percent by volume of ultra-high molecular weight (UHMW) polyethylene fibers and 18-30 percent by volume of graphite fibers, and a remaining percent by volume of an epoxy resin matrix;
- a second composite bonded to said first composite, said second composite having approximately 68 percent by volume of UHMW polyethylene fibers impregnated with a remaining percent by volume of a polyethylene matrix, said UHMW polyethylene fibers in said second composite arranged in orthogonally crossed plies; and
- a ceramic material bonded to said second composite wherein said second composite is sandwiched between said first composite and said ceramic material, said ceramic material being selected from the group consisting of aluminum oxide, boron carbide and silicon carbide.

17. A multi-functional structure as in claim 16 wherein said epoxy resin matrix comprises a thermo-set matrix.

18. A multi-functional structure as in claim 16 wherein said first composite comprises at least one ply of said UHMW polyethylene fibers interwoven with said graphite fibers with said epoxy resin matrix impregnated in said at least one ply.

19. A multi-functional structure as in claim 16 wherein said first composite comprises multiple plies defined by at least one ply of said UHMW polyethylene fibers and at least one separate ply of said graphite fibers with said epoxy resin matrix impregnated in and between said multiple plies.

20. A multi-functional structure as in claim 16 wherein said ceramic material comprises ceramic tiles.

\* \* \* \* \*